(No Model.)
E. NORTON.
COMBINED COFFEE CANISTER AND MILL.
No. 298,017. Patented May 6, 1884.
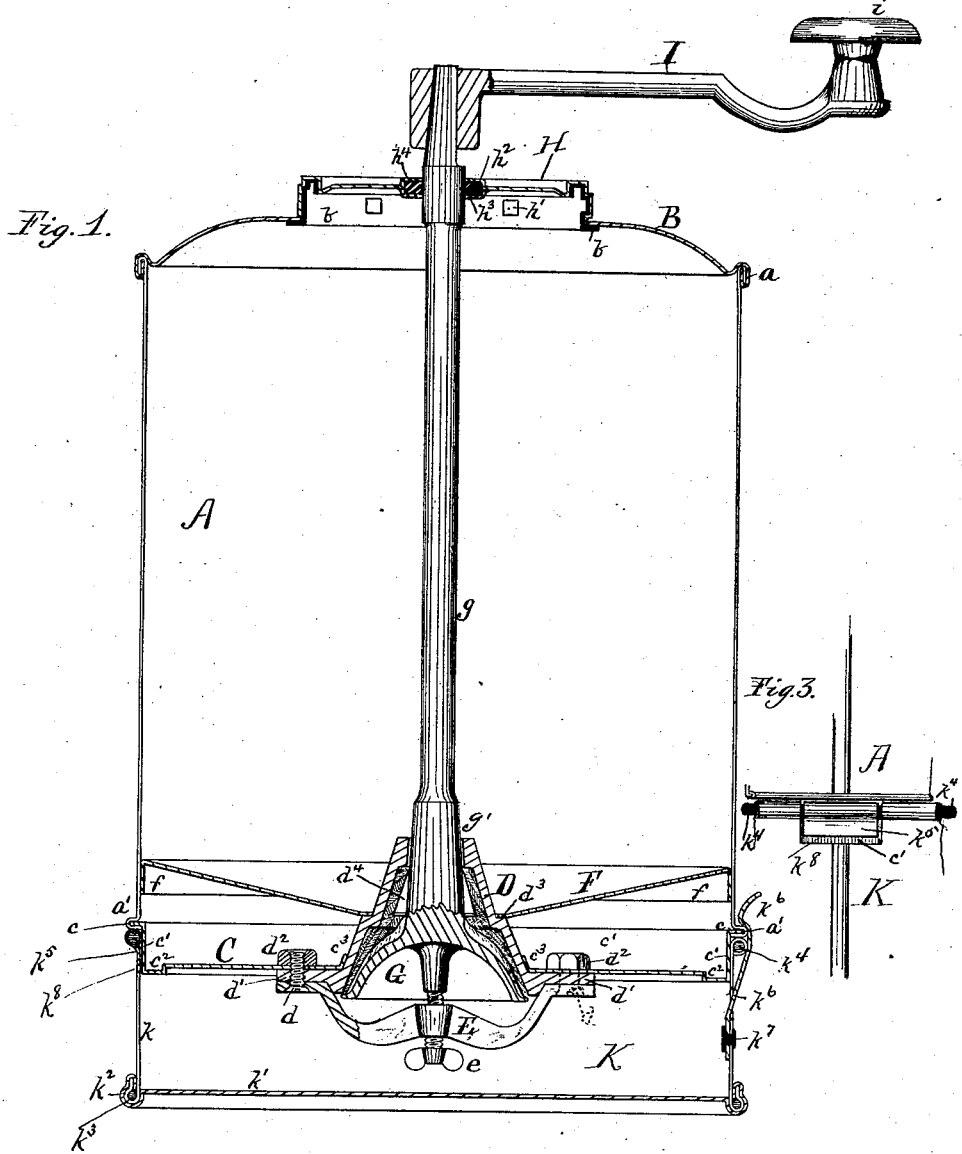
Witnesses:
Taylor E. Brown
Chas. L. Carman
Inventor
Edwin Norton,
per Munday Evarts and Adcock
his Attorneys.

UNITED STATES PATENT OFFICE.

EDWIN NORTON, OF CHICAGO, ILLINOIS, ASSIGNOR TO HIMSELF AND OLIVER W. NORTON, OF SAME PLACE.

COMBINED COFFEE CANISTER AND MILL.

SPECIFICATION forming part of Letters Patent No. 298,017, dated May 6, 1884.

Application filed October 20, 1883. (No model.)

*To all whom it may concern:*

Be it known that I, EDWIN NORTON, a citizen of the United States, residing in Chicago, in the county of Cook and State of Illinois, have invented a new and useful Improvement in a Combined Coffee Canister and Mill, of which the following is a specification.

This invention relates to a combined coffee canister and mill; and it consists in the novel construction of the canister and mill, and in the means for combining the same, as hereinafter more fully described, shown, and claimed, whereby I am enabled to produce at small cost a convenient, durable, and efficient device for both keeping and grinding coffee, and by means of which the flavor or aroma of the coffee may be preserved and the berries ground without removing them from the canister. The body of the canister I make, preferably, of cylindrical form, and ordinarily of enameled tin, so as to give the device an ornamental appearance, the top and bottom of the canister being united to the body by folded seams without solder, as the heat of the solder would injure the enameled surface. The stationary grinding-shell is secured to the bottom of the canister and projects up through an opening therein. The rotary grinding-cone is secured to a shaft which projects up through the canister, the shaft having a bearing at its upper end in the cover of the canister, and at its lower end in the top part of the stationary grinding cone or shell. A supplemental funnel-shaped bottom is provided, so as to feed the coffee-berries into the mill. The rotary grinding-cone is set up against the stationary shell, so as to grind coarse or fine, by means of an adjusting-screw, which passes through a bridge-piece secured to the bottom of the canister by the same screws that attach the stationary grinding-shell thereto. These screws enter nuts soldered to the bottom of the canister on the inside. The shaft-bearing in the cover is formed by a washer secured thereto. The top of the canister is provided with a seamless ring having screw-coupling devices which engage with corresponding coupling devices in the cover, so as to close the same tight and prevent the coffee losing its aroma. A removable box or receptacle is provided at the bottom of the canister for the ground coffee, into which the same falls as it is ground by the mill. This box is hinged at its back to the canister by means of a strap soldered to the canister and looped over the stiffening-wire at the top of the box. A spring-clamp fastens the hinged box to the canister at its front, the clamp fitting over an exterior crimp in the canister, which forms part of the seam uniting the body of the canister to the bottom.

In the accompanying drawings, which form a part of this specification, and in which similar letters of reference indicate like parts, Figure 1 is a central vertical section of a device embodying my invention. Fig. 2 is a detail side view of the cover, and Fig. 3 is a detail view of the hinge.

In the drawings, A represents the body of the canister, secured to the top B by a double seam, $a$, and to the bottom C by a crimp or squeezed seam consisting of the exterior crimp, $a'$, in the body, in which fits the shoulder $c$, laid off on the vertical flange or rim $c'$ of the bottom C.

D is the stationary grinding-shell, projecting up through an opening in and secured to the bottom C by screws $d$, which pass through a horizontal flange, $d'$, on said shell, and enter threaded nuts $d^2$, soldered or otherwise secured to the bottom C. The bridge-piece E, which carries the set-screw $e$, is also secured to the bottom C by these same screws. The bottom C is provided with an offset, $c^2$, and its inner edge is turned up, forming a flange or shoulder, $c^3$, which fits against the shell D, for the purpose of strengthening and stiffening the bottom and bracing the shell D, and rendering its attachment to the bottom firm and secure. The upturned rim $c'$ and shoulder $c$ also serve to strengthen and stiffen the bottom. The shell D is provided with a shoulder or offset $d^3$, upon which rests the dished or funnel-shaped supplemental bottom F, and also with openings $d^4$, through which the coffee-berries enter the mill. The dished bottom F has a depending flange or shoulder, $f$, which fits tight against the canister-body, so as to render the bottom firm and prevent its tilting. The supplemental bottom F not only serves to feed the coffee into the mill, but also to brace and steady the stationary grinding-shell D.

G is the rotary grinding-cone, secured to or cast integral with the shaft $g$. The shaft $g$ has its lower bearing, $g'$, in the top part of the shell D, and its upper bearing in the cover H. The cover H is fixed rigidly and securely to the top B by screw-coupling devices $h$, which engage with corresponding coupling devices, $h'$, on the seamless ring $b$, which is soldered or otherwise secured to the top B.

The screw-coupling devices $h$ $h'$ are fully set forth and described in the Letters Patent No. 235,279, granted to me for the same on December 7, 1880, and for a more full and complete description of the same I would refer to said patent.

The shaft-bearing in the cover H consists of a washer, $h^2$, which may preferably be made of pressed paper, and secured to the cover H by a sheet-metal cap, $h^3$, which fits over the washer on the under side thereof, and inside a corresponding recess, $h^4$, formed in the cover. Solder is used to secure the cap $h^3$ to the recess $h^4$ and confine the washer between the two. I is the crank, provided with the handle $i$. K is the box or receptacle for the ground coffee, composed of the body $k$ and bottom $k'$, united together in any suitable manner, but preferably by a folded seam, $k^2$, embracing a strengthening-wire, $k^3$. A similar wire, $k^4$, is also provided at the top of the box K, and the box is hinged to the bottom C of the canister by a strap, $k^5$, folded over the wire $k^4$ and soldered to the rim $c'$ of said bottom. The strap $k^5$ projects out through a notch or opening, $k^8$, in the body $k$. A spring-clamp, $k^6$, inserted through a slot in the body $k$ and secured thereto by a rivet, $k^7$, serves to fasten the opposite side of the box K to the canister, said spring-clamp fitting over the crimp $a'$ in the body A. In Fig. 3 the vertical lines above and below the hinge are intended to indicate the side seams in the canister-body A and body $k$ of the box K, respectively.

What I claim is—

1. The combination, with a sheet-metal coffee-canister, of a removable box at the bottom of the same for the reception of the ground coffee, and a coffee-mill having its stationary grinder secured to the sheet-metal bottom of the canister, and projecting up through an opening in the same, and having its rotary grinder secured to a shaft which projects up through the canister, and is journaled at its upper end in the removable sheet-metal cover of the canister and at its lower end in the stationary grinder, said sheet-metal cover being provided with screw-coupling devices to secure the cover rigidly to the canister, and thus afford a fixed bearing for the shaft, substantially as specified.

2. The combination, with the sheet-metal bottom C of the canister, of the stationary grinding cone or shell projecting up through an opening in said bottom, and secured thereto by screws passing through a flange on said cone and entering nuts soldered to said bottom, substantially as specified.

3. The combination, with sheet-metal canister-bottom C, of stationary grinding-cone D and bridge-piece E, secured to said bottom C by screws entering threaded nuts soldered to said bottom, substantially as specified.

4. The combination, with bottom C, of body A, having an exterior crimp, $a'$, and hinged box K, provided with a spring-clamp adapted to fit over said crimp to fasten said box to the canister, substantially as specified.

5. The combination, with canister-body A, of bottom C, secured thereto, and box K, provided with a wire at its top, and hinged to said bottom C by a strap folded over said wire and soldered to said bottom, substantially as specified.

Chicago, Illinois, this 17th day of October, A. D. 1883.

EDWIN NORTON.

Witnesses:
TAYLOR E. BROWN,
EDMUND ADCOCK.